United States Patent
Tajima et al.

(10) Patent No.: US 9,776,046 B2
(45) Date of Patent: Oct. 3, 2017

(54) GOLF BALL

(71) Applicant: Bridgestone Sports Co., Ltd., Tokyo (JP)

(72) Inventors: Kanae Tajima, Chichibushi (JP); Katsunobu Mochizuki, Chichibushi (JP); Hiroyuki Nagasawa, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 14/977,716

(22) Filed: Dec. 22, 2015

(65) Prior Publication Data
US 2017/0173399 A1 Jun. 22, 2017

(51) Int. Cl.
A63B 37/12 (2006.01)
C08G 18/72 (2006.01)
A63B 37/00 (2006.01)

(52) U.S. Cl.
CPC ...... *A63B 37/0074* (2013.01); *A63B 37/0023* (2013.01); *A63B 37/0027* (2013.01); *A63B 37/0075* (2013.01); *A63B 37/0076* (2013.01); *A63B 37/0095* (2013.01); *A63B 37/0096* (2013.01); *C08G 18/72* (2013.01)

(58) Field of Classification Search
CPC ........... B29L 2031/546; A63B 37/0027; A63B 37/0023; A63B 37/0032; A63B 37/0095
See application file for complete search history.

(56) References Cited

U.S. PATENT DOCUMENTS

| | | | |
|---|---|---|---|
| 6,458,307 B2 * | 10/2002 | Inoue .................. | A63B 37/0003 264/232 |
| 6,729,975 B2 | 5/2004 | Inoue et al. | |
| 6,747,100 B2 | 6/2004 | Ichikawa et al. | |
| 6,939,251 B2 | 9/2005 | Ichikawa et al. | |
| 7,867,111 B2 | 1/2011 | Matroni et al. | |
| 8,182,367 B2 * | 5/2012 | Nagasawa .......... | A63B 37/0023 473/351 |
| 8,367,781 B2 | 2/2013 | Nagasawa et al. | |
| 8,696,494 B1 * | 4/2014 | Parnell ............... | A63B 37/0074 473/378 |
| 2004/0077434 A1 * | 4/2004 | Matroni ............. | A63B 37/0003 473/351 |

(Continued)

FOREIGN PATENT DOCUMENTS

| | | |
|---|---|---|
| JP | 3494441 B | 2/2001 |
| JP | 2002336378 A | 11/2002 |

(Continued)

*Primary Examiner* — John E Simms, Jr.
(74) *Attorney, Agent, or Firm* — Sughrue Mion, PLLC

(57) ABSTRACT

The invention provides a golf ball having a core and a cover of one or more layer encasing the core, wherein the cover has an outermost layer molded of a thermoplastic material selected from the group consisting of polyurethane, polyurea and mixtures thereof and, letting the absorbance peak heights near a wave number of 1512 cm$^{-1}$ measured by the attenuated total reflectance method in Fourier transform infrared absorption spectroscopy (FT-IR/ATR spectroscopy) at an outside portion and an inside portion of the outermost cover layer be respectively $P_1$ and $P_2$, the value $P_1$-$P_2$ is at least 0.02.

8 Claims, 2 Drawing Sheets

(56) References Cited

U.S. PATENT DOCUMENTS

| | | | | |
|---|---|---|---|---|
| 2005/0049082 A1* | 3/2005 | Tzivanis | ............ | A63B 37/0003 |
| | | | | 473/378 |
| 2005/0079929 A1* | 4/2005 | Tzivanis | ............ | A63B 37/0003 |
| | | | | 473/370 |
| 2007/0222120 A1* | 9/2007 | Melanson | ............... | B29C 71/04 |
| | | | | 264/485 |
| 2008/0051222 A1* | 2/2008 | Matroni | ............. | A63B 37/0003 |
| | | | | 473/377 |
| 2010/0056304 A1* | 3/2010 | Egashira | ............ | A63B 37/0003 |
| | | | | 473/378 |

FOREIGN PATENT DOCUMENTS

| | | |
|---|---|---|
| JP | 4051374 B2 | 2/2008 |
| JP | 4114198 B2 | 7/2008 |
| JP | 4247735 B2 | 4/2009 |
| JP | 5212599 B2 | 6/2013 |

* cited by examiner

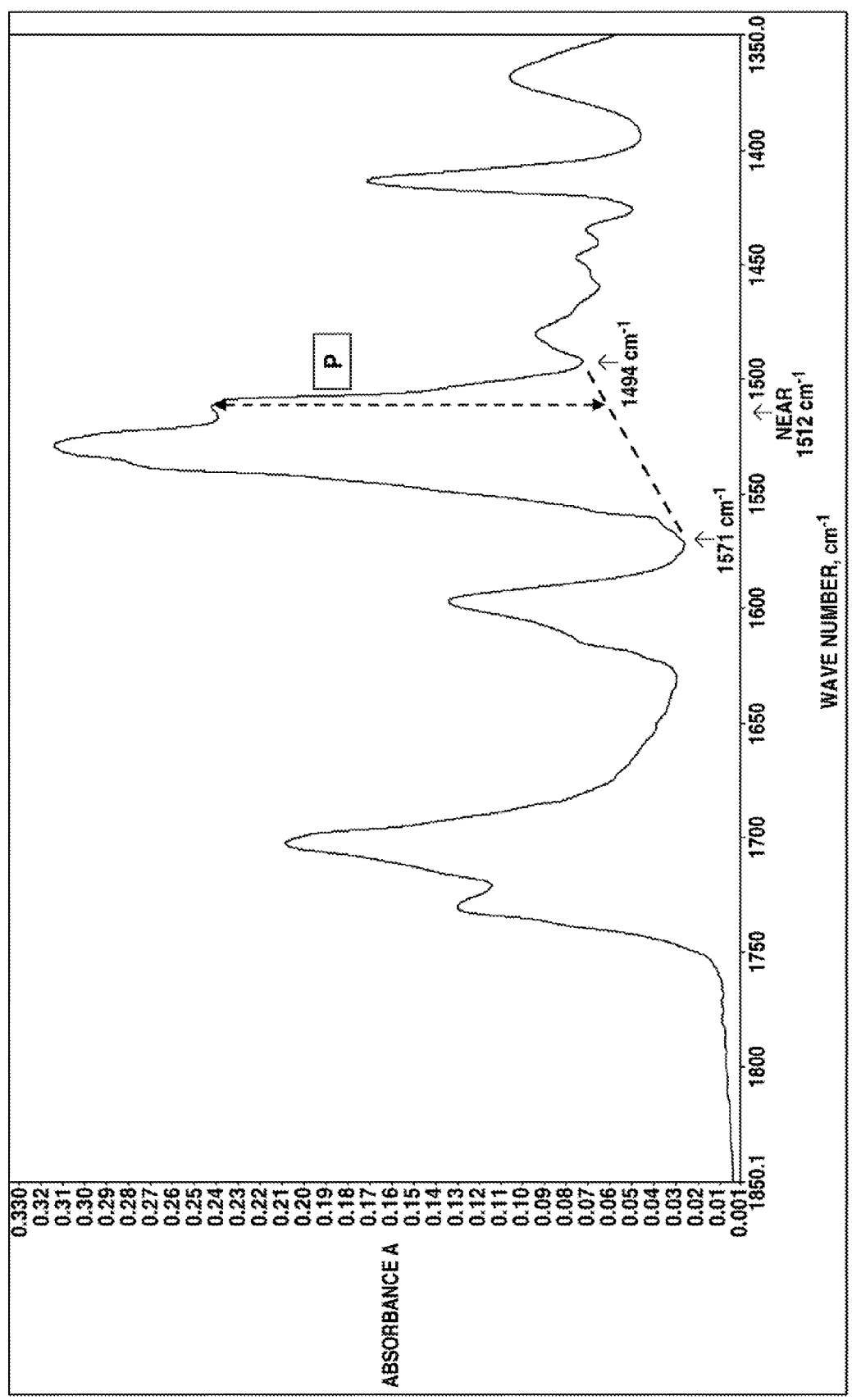

GOLF BALL

BACKGROUND OF THE INVENTION

The present invention relates to a golf ball made of a core and a cover of one or more layer encasing the core. More particularly, the invention relates to an improved golf ball in which the degree of crosslinking due to urethane bonds is varied between an outside portion and an inside is portion of the cover, thereby endowing the ball with an excellent scuff resistance, excellent spin properties, and an excellent feel on approach shots, resistance to discoloration and productivity.

The use of polyurethane materials as golf ball cover-forming materials in recent years is noteworthy. Polyurethane materials, from the standpoint of the molding method used to obtain moldings therefrom, are broadly divided into thermoset polyurethane materials and thermoplastic polyurethane materials.

However, moldings of thermoset polyurethane materials have no plasticity when heated, and so the feedstock and molded articles made therewith cannot be recycled. Moreover, in the production of such moldings, the thermosetting step and the cooling step take a long time, in addition to which the feedstock has a high reactivity when heated and is thus unstable, making the molding time very difficult to control. Hence, the productivity of thermoset polyurethane materials when used to make special moldings such as golf ball covers (moldings which encase a core material) is regarded as poor.

By contrast, moldings of thermoplastic polyurethane materials are not obtained by the direct reaction of a feedstock; instead, a linear polyurethane material synthesized by using starting materials and a production process which differ somewhat from the foregoing thermoset polyurethane materials are used in molding. Such polyurethane materials are thermoplastic; thermoplasticized polyurethane materials have the quality of hardening on cooling. Therefore, it is possible to mold such polyurethane materials using an injection molding machine. The injection molding of thermoplastic polyurethane materials is ideal as a method of molding golf ball covers, both because the molding time is very short compared with the molding time for thermoset polyurethane materials and because this method is suitable for precision molding. Also, thermoplastic polyurethane materials are recyclable and thus friendly to the global environment.

JP-A 2002-336378 describes a golf ball obtained using a cover material composed of a thermoplastic polyurethane material and an isocyanate mixture. The cover material is a thermoplastic polyurethane material that is recyclable and moreover has a high resilience and an excellent scuff resistance. This cover material makes it possible both to achieve the good productivity of a thermoplastic polyurethane and to exhibit physical properties comparable with those of a thermoset polyurethane; at the same time, due to the plasticizing effect by the isocyanate compound, such an approach enhances the flow properties of the thermoplastic polyurethane material and is thus able to improve productivity. Although this art is outstanding in the above respects, because burn contaminants arise due to direct charging of the isocyanate mixture into the molding machine and there is some variability in the compounding ratio owing to the use of dry blending, the uniformity is poor, giving rise to molding instability. At the same time, the compositional ratio within the isocyanate mixture between the isocyanate compound and the thermoplastic resin that is substantially non-reactive with isocyanate has already been set, and so one has less freedom of choice in the amounts and types of isocyanate compound and thermoplastic resin to be added.

JP 5212599 describes a golf ball which has a high rebound and an excellent spin performance and scuff resistance, and also has a high cover material flowability and a high productivity. However, the thermoplastic polyurethane material used in this art is a special resin mixture, and there are challenges regarding the production, supply and cost of such a resin mixture. Moreover, because this art entails charging an injection molding machine and ancillary equipment with a material in which isocyanate groups remain in an unreacted state, undesirable effects such as seizing and solidification due to deposition of the isocyanate ingredient arise and can cause an increase in the percent defective.

JP 3494441 discloses art where, in a golf ball having a cover made of thermoplastic resin, the surface layer of the cover is subjected to modification treatment, thereby giving a cover having excellent properties. However, although this is an excellent approach that enables the properties to be modified after the cover has been molded of a thermoplastic material of excellent moldability, there remains room for improvement in the degree to which the scuff resistance is enhanced and in the golf ball properties following modification. Particularly in cases where 4,4'-diphenylmethane diisocyanate (MDI) has been selected as the polyisocyanate compound, the MDI must be held at the solidifying point (about 39° C.) or higher in order to place it in a molten liquid state suitable for treatment. In the case of MDI, production of the dimer also requires care; that is, dimer production generally speeds up at a higher temperature, and so close temperature control is required to ensure stable productivity, which can be troublesome. Moreover, in cases where an ionomer material is used in part of the golf ball, there is also a possibility that treatment at a high temperature will give rise to deformation or a change in properties.

JP 4051374 describes a method of manufacturing golf balls produced with a thermoplastic polyurethane, polyurea or mixed material thereof having a high melt index. More specifically, this method includes the step of obtaining a base thermoplastic polyurethane, polyurea or mixed material thereof; the step of raising the melt index of this base resin material; the step of molding the thermoplastic polyurethane material having an increased melt index in a mold; and the subsequent step of treating the molded material with a secondary curing agent such as an isocyanate solution. This art is outstanding in that, by crosslinking the cover material using an isocyanate ingredient, resistance to damage can be imparted while maintaining the other desirable characteristics of the cover, such as a soft feel. However, in cases where the secondary curing agent includes an organic solvent capable of causing the cover material to swell, depending on the treatment conditions, this may cause deformations on the order of several microns in the dimple shape, which may adversely impact the flight performance, and the appearance of the golf ball may worsen due to solvent infiltration to the cover material interface that arises during molding.

SUMMARY OF THE INVENTION

It is therefore an object of the invention to provide a golf ball having an excellent scuff resistance, spin properties, feel on approach shots, discoloration resistance and productivity that are even better than those of prior-art golf balls.

The inventors have conducted extensive investigations, as a result of which they have discovered that, in a golf ball made of a core and a cover of one or more layer encasing the core, when the cover has an outermost layer molded of a thermoplastic material selected from the group consisting of polyurethane, polyurea and mixtures thereof and this outermost layer is constructed in such a way that, letting the absorbance peak heights near 1512 cm$^{-1}$ measured by the attenuated total reflectance method in Fourier transform infrared absorption spectroscopy (FT-IR/ATR spectroscopy) at an outside portion and an inside portion of the outermost cover layer be respectively $P_1$ and $P_2$, the value $P_1$-$P_2$ is at least 0.02, the golf ball having this outermost layer is endowed with an excellent scuff resistance and has a good spin performance, feel on approach shots, discoloration resistance and productivity.

That is, making use of the fact that the absorbance peak heights near 1512 cm$^{-1}$ measured by FT-IR/ATR spectroscopy represent amide groups (NHCO groups) from urethane bonds, this invention was arrived at by carrying out quantitative chemical analysis of the degree to which, at an inside portion and an outside portion of the outermost layer, crosslinking reactions have proceeded between a thermoplastic material selected from the group consisting of polyurethane, polyurea and mixtures thereof and a polyisocyanate compound.

Accordingly, the invention provides the following golf ball.

[1] A golf ball having a core and a cover of one or more layer encasing the core, wherein the cover has an outermost layer molded of a thermoplastic material selected from the group consisting of polyurethane, polyurea and mixtures thereof and, letting the absorbance peak heights near a wave number of 1512 cm$^{-1}$ measured by the attenuated total reflectance method in Fourier transform infrared absorption spectroscopy (FT-IR/ATR spectroscopy) at an outside portion and an inside portion of the outermost cover layer be respectively $P_1$ and $P_2$, the value $P_1$-$P_2$ is at least 0.02.

[2] The golf ball of [1], wherein the value $P_1$-$P_2$ obtained from the absorbance peak heights $P_1$ and $P_2$ at the outside portion and inside portion of the outermost cover layer is from 0.05 to 0.35.

[3] The golf ball of [1], wherein the absorbance peak height $P_1$ at the outside portion of the outermost cover layer is from 0.15 to 0.40.

[4] The golf ball of [1], wherein the absorbance peak height $P_2$ at the inside portion of the outermost cover layer is from 0 to 0.10.

[5] The golf ball of [1] wherein, letting the absorbance peak height near the wave number 2280 cm$^{-1}$ and the absorbance peak height near the wave number 2840 cm$^{-1}$ measured by FT-IR/ATR spectroscopy at the outside portion of the outermost cover layer be respectively $Q_1$ and $R_1$, the value $Q_1/R_1$ is 0.20 or less.

[6] The golf ball of [1], wherein the outermost layer of the cover is molded of a thermoplastic material selected from the group consisting of polyurethane, polyurea and mixtures thereof, and the surface of the cover is treated with an isocyanate compound that is free of organic solvent.

[7] The golf ball of [1], wherein the isocyanate compound is one or a mixture of two or more selected from the group consisting of tolylene-2,6-diisocyanate, tolyene-2,4-diisocyanate, 4,4'-diphenylmethanediisocyanate, polymethylene polyphenyl polyisocyanate, 1,5-diisocyanatonaphthalene, isophorone diisocyanate (including isomer mixtures), dicyclohexylmethane-4,4'-diisocyanate, hexamethylene-1,6-diisocyanate, m-xylylene diisocyanate, hydrogenated xylylene diisocyanate, tolidine diisocyanate, norbornene diisocyanate, derivatives thereof, and prepolymers formed of the isocyanate compounds.

BRIEF DESCRIPTION OF THE DIAGRAMS

FIG. 2 is an enlarged view of part of the infrared absorption spectrum shown in FIG. 1.

DETAILED DESCRIPTION OF THE INVENTION

Figure 1:
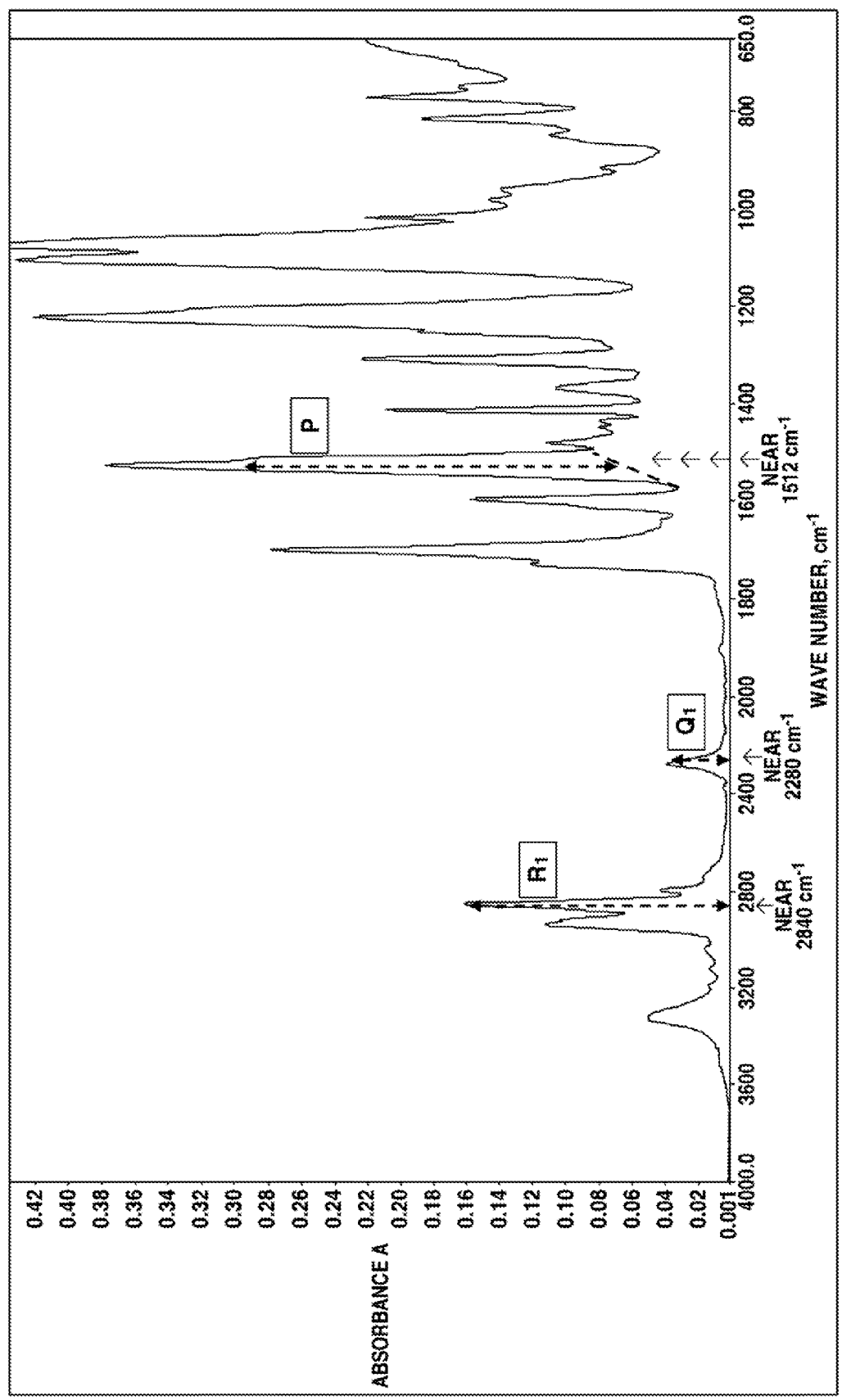
FIG. 1 shows an example of an infrared absorption spectrum (indicating absorbance) measured by FT-IR/ATR spectroscopy at a specific portion of the outermost layer of a golf ball cover.

The invention is described more fully below.

This invention uses FT-IR spectroscopy to measure the degree to which, owing to treatment of the surface of an outermost layer of a golf ball with an isocyanate compound, crosslinking reactions have proceeded within urethane resin at the ball surface, and specifies the relationship between the absorbance peak heights at an outside portion and an inside portion of the outermost layer. In this invention, the outermost layer of the golf ball cover is molded of a thermoplastic material selected from the group consisting of polyurethane, polyurea and mixtures thereof. These materials are subsequently described.

As used herein, "outside portion of the outermost layer" refers to a portion that includes not only a surface of the outermost layer, but also extends up to a region 100 μm from this surface and toward the core center. Similarly, "inside portion of the outermost layer" refers to a portion that includes not only a back face of the outermost layer, but also extends up to a region 100 μm from this back face and toward the surface.

This invention is characterized in that, letting the absorbance peak heights near a wave number of 1512 cm$^{-1}$ measured by FT-IR/ATR spectroscopy at an outside portion and an inside portion of the outermost cover layer be respectively $P_1$ and $P_2$, the value $P_1$-$P_2$ is at least 0.02. Here, the absorbance peak heights $P_1$ and $P_2$ refer to absorbance peak heights measured relative to the infrared absorption spectrum from the wave number 1494 cm$^{-1}$ to the wave number 1571 cm$^{-1}$ as the baseline. FIG. 1 shows a chart indicating, in terms of absorbance, the infrared absorption spectrum measured by FT-IR/ATR spectroscopy, and FIG. 2 is an enlarged view of part of the chart shown in FIG. 1. As shown in FIG. 2, baseline correction is carried out so as to set the absorbances at wave numbers of 1494 cm$^{-1}$ and 1571 cm$^{-1}$ to 0, and $P_1$ and $P_2$ are determined as the absorbance peak heights following correction. The reason for computing the absorbance peak heights relative to a baseline is that there is a need to correct for variability in the measured values for absorbance that arise with each measurement. To increase the accuracy of the measured data, the absorbance peak height is determined by increasing the number of measurements (N) and having the relative standard deviation (%) (also referred to below as "RSD") be 3.0% or less. The relative standard deviation (%) is expressed by the following formula.

Relative standard deviation (%)=(standard deviation/average value)×100

These absorbance peak heights $P_1$, $P_2$ refer to peak strengths in the infrared absorption spectrum. The absorbance peak height near the wave number 1512 cm$^{-1}$ is the absorbance peak height of bending vibrations by the amide group (NHCO group) in urethane bonds. That is, when the absorbance peak strength $P_1$ is large, crosslinking of the urethane resin is inferred to have proceeded further in the outside portion of the outermost layer than in the inside portion. Such a change in crosslinking within the layer appears to affect the ball properties on shots with a driver and on approach shots, to enhance ball characteristics such as scuff resistance and spin performance, and to contribute to a good feel on approach shots and to discoloration resistance.

With regard to these absorbance peak heights $P_1$ and $P_2$, the value $P_1$-$P_2$ although not particularly limited, is preferably from 0.05 to 0.35. Outside of this range, improvements in the spin performance and scuff resistance of the ball may fail to materialize, the feel on approach shots and the discoloration resistance may leave something to be desired and problems with productivity may arise. The absorbance peak height $P_1$ is preferably from 0.15 to 0.40, and the absorbance peak height $P_2$ is preferably from 0 to 0.10. Outside of these ranges, improvements in the spin performance and scuff resistance may fail to materialize, the feel on approach shots and discoloration resistance may leave something to be desired and problems with productivity may arise.

Letting the absorbance peak heights near the wave numbers 2280 cm$^{-1}$ and 2840 cm$^{-1}$ measured by FT-IR/ATR spectroscopy at the outside portion of the outermost cover layer be respectively $Q_1$ and $R_1$, the value $Q_1/R_1$ is preferably 0.20 or less. The absorbance peak height near the wave number 2280 cm$^{-1}$ represents the peak strength from isocyanate groups (NCO groups), and the absorbance peak height near the wave number 2840 cm$^{-1}$ represents the peak strength from CH stretching vibrations. Therefore, the $Q_1/R_1$ value indicates the proportion of remaining isocyanate groups (NCO groups). For example, when 100% of the polyisocyanate compound reacts with a resin material such as polyurethane to form amide groups (NHCO groups), the peak strength from the remaining isocyanate groups (NCO groups) becomes zero. A $Q_1/R_1$ value of 0.20 or less means that a majority of the polyisocyanate compound has reacted with the resin material such as polyurethane to form, for example, urethane bonds, and that crosslinking of the resin material such as polyurethane has proceeded to a large degree. When the $Q_1/R_1$ value is more than 0.20, there are many remaining NCO groups and the ball appearance becomes discolored; hence, improvements in discoloration resistance, etc. may not be obtained. Measurement of the absorbance peak height near the wave number 2280 cm$^{-1}$ is preferably carried out within three weeks following treatment of the outermost layer.

FT-IR analysis at the outside portion and inside portion of the outermost cover layer entails measurement by the ATR method or by the ATR method with IR microscopy after preparation of an unpainted ball or, when a painted ball is to be used, after removing the paint, so that the sample surface is sufficiently smooth. In carrying out measurement, the number of measurements (N) is increased until the relative standard deviation of the measurement data becomes 3.0% or less. Because it takes several days for the crosslinking reactions to stabilize at the outside portion and inside portion of the outermost layer, it is preferable to measure the samples when about one week has elapsed following treatment. FT-IR/ATR spectroscopy may be carried out in accordance with the method described in JIS K 0117.

The thickness of the outermost layer may be set in the range of 0.4 to 3.0 mm, preferably from 0.5 to 2.0 mm, and more preferably from 0.6 to 1.5 mm. Outside of this range, golf ball properties such as the scuff resistance and spin performance may not satisfy the target performance.

When the cover is formed as a multilayer structure of two or more layers, the thickness of the layers other than the outermost layer, although not particularly limited, may be set in the range of from 0.1 to 5.0 mm, preferably from 0.3 to 3.0 mm, and more preferably from 0.5 to 2.0 mm.

The outermost layer described above can be formed by injection-molding a known resin composition over the core or an intermediate sphere. In particular, to vary the degree to which crosslinking has proceeded within the outermost layer, the outermost layer is molded of a thermoplastic material selected from the group consisting of polyurethane, polyurea and mixtures thereof. This variation in the degree of crosslinking can be achieved by also treating the surface of the cover with an isocyanate compound that is free of organic solvent.

The proportion of the overall resin composition accounted for by the polyurethane, polyurea or a mixture thereof, although not particularly limited, may be set to at least 50 wt %, and preferably at least 80 wt %. The polyurethane and polyurea are described below.

Polyurethane

The thermoplastic polyurethane material has a structure which includes soft segments composed of a polymeric polyol that is a long-chain polyol (polymeric glycol), and hard segments composed of a chain extender and a polyisocyanate. Here, the polymeric polyol serving as a starting material is not subject to any particular limitation, and may be any that is used in the prior art relating to thermoplastic polyurethane materials. Exemplary polymeric polyols include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. Illustrative examples of polyester polyols include adipate-based polyols such as polyethylene adipate glycol, polypropylene adipate glycol, polybutadiene adipate glycol and polyhexamethylene adipate glycol; and lactone-based polyols such as polycaprolactone polyol. Illustrative examples of polyether polyols include polyethylene glycol), polypropylene glycol), poly(tetramethylene glycol) and poly(methyltetramethylene glycol). These may be used singly or as a combination of two or more thereof.

The number-average molecular weight of these long-chain polyols is preferably in the range of 500 to 5,000. By using a long-chain polyol having such a number-average molecular weight, golf balls made with a thermoplastic polyurethane composition having excellent properties such as the above-mentioned resilience and productivity can be reliably obtained. The number-average molecular weight of the long-chain polyol is more preferably in the range of 1,500 to 4,000, and even more preferably in the range of 1,700 to 3,500.

Here, and below, "number-average molecular weight" refers to the number-average molecular weight calculated based on the hydroxyl number measured in accordance with JIS K-1557.

The chain extender is not particularly limited, although preferred use may be made of those employed in the prior art relating to thermoplastic polyurethanes. A low-molecular-weight compound which has a molecular weight of 2,000 or less and bears on the molecule two or more active hydrogen atoms capable of reacting with isocyanate groups may be used in this invention, with the use of an aliphatic diol having from 2 to 12 carbons being preferred. Specific examples of the chain extender include 1,4-butylene glycol, 1,2-ethylene glycol, 1,3-butanediol, 1,6-hexanediol and 2,2- dimethyl-1,3-propanediol. Of these, the use of 1,4-butylene glycol is especially preferred.

The polyisocyanate compound is not subject to any particular limitation, although preferred use may be made of those employed in the prior art relating to thermoplastic polyurethanes. Specific examples include one, two or more selected from the group consisting of 4,4'-diphenylmethane diisocyanate, 2,4-toluene diisocyanate, 2,6-toluene diisocyanate, p-phenylene diisocyanate, xylylene diisocyanate, naphthylene-1,5-diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, 1,4-bis(isocyanatomethyl)cyclohexane and dimer acid diisocyanate. Depending on the type of isocyanate used, the cross-linking reaction during injection molding may be difficult to control.

Although not an essential ingredient, a thermoplastic resin or elastomer other than a thermoplastic polyurethane may also be included. More specifically, use may be made of one, two or more selected from among polyester elastomers, polyamide elastomers, ionomer resins, styrene block is elastomers, hydrogenated styrene-butadiene rubbers, styrene-ethylene/butylene-ethylene block copolymers and modified forms thereof, ethylene-ethylene/butylene-ethylene block copolymers and modified forms thereof, styrene-ethylene/butylene-styrene block copolymers and modified forms thereof, ABS resins, polyacetals, polyethylenes and nylon resins. The use of polyester elastomers, polyamide elastomers and polyacetals is especially preferred because these increase the resilience and scuff resistance due to reaction with the isocyanate groups while yet maintaining a good productivity. When these ingredients are included, the content thereof is suitably selected so as to, for example, adjust the cover material hardness, improve the resilience, improve the flow properties or improve adhesion. The content of these ingredients, although not particularly limited, may be set to preferably at least 5 parts by weight per 100 parts by weight of the thermoplastic polyurethane component. Although there is no particular upper limit, the content per 100 parts by weight of the thermoplastic polyurethane component may be set to preferably not more than 100 parts by weight, more preferably not more than 75 parts by weight, and even more preferably not more than 50 parts by weight.

The ratio of active hydrogen atoms to isocyanate groups in the above polyurethane-forming reaction may be adjusted within a desirable range so as to make it possible to obtain golf balls which are made with a thermoplastic polyurethane composition and have various improved properties, such as rebound, spin performance, scuff resistance and productivity. Specifically, in preparing a thermoplastic polyurethane by reacting the above long-chain polyol, polyisocyanate compound and chain extender, it is desirable to use the respective components in proportions such that the amount of isocyanate groups included in the polyisocyanate compound per mole of active hydrogen atoms on the long-chain polyol and the chain extender is from 0.95 to 1.05 moles.

No particular limitation is imposed on the method of preparing the thermoplastic polyurethane. Preparation may be carried out by either a prepolymer process or a one-shot process using a known urethane-forming reaction.

A commercial product may be used as the above thermoplastic polyurethane material. Illustrative examples include the products available under the trade name "Pandex" from DIC Bayer Polymer, Ltd., and the products available under the trade name "Resamine" from Dainichiseika Color & Chemicals Mfg. Co., Ltd.

Polyurea

The polyurea is a resin composition composed primarily of urea linkages formed by reacting (i) an isocyanate with (ii) an amine-terminated compound. This resin composition is described in detail below.

(i) Isocyanate

The isocyanate is preferably one that is used in the prior art relating to thermoplastic polyurethanes, but is not subject to any particular limitation. Use may be made of isocyanates similar to those described above in connection with the polyurethane material.

(ii) Amine-Terminated Compound

An amine-terminated compound is a compound having an amino group at the end of the molecular chain. In the present invention, the long-chain polyamines and/or amine curing agents shown below may be used.

A long-chain polyamine is an amine compound which has on the molecule at least two amino groups capable of reacting with isocyanate groups, and which has a number-average molecular weight of from 1,000 to 5,000. In this invention, the number-average molecular weight is more preferably from 1,500 to 4,000, and even more preferably from 1,900 to 3,000. Within this average molecular weight range, an even better resilience and productivity are obtained. Examples of such long-chain polyamines include, but are not limited to, amine-terminated hydrocarbons, amine-terminated polyethers, amine-terminated polyesters, amine-terminated polycarbonates, amine-terminated polycaprolactones, and mixtures thereof. These long-chain polyamines may be used singly, or as combinations of two or more thereof.

An amine curing agent is an amine compound which has on the molecule at least two amino groups capable of reacting with isocyanate groups, and which has a number-average molecular weight of less than 1,000. in this invention, the number-average molecular weight is more preferably less than 800, and even more preferably less than 600. Such amine curing agents include, but are not limited to, ethylenediamine, hexamethylenediamine, 1-methyl-2,6-cyclohexyldiamine, tetrahydroxypropylene ethylenediamine, 2,2,4- and 2,4,4-trimethyl-1,6-hexanediamine, 4,4'-bis(sec-butylamino)dicyclohexylmethane, 1,4-bis(sec-butylamino)cyclohexane, 1,2-bis(sec-butylamino)cyclohexane, derivatives of 4,4'-bis(sec-butylamino)dicyclohexylmethane, 4,4'-dicyclohexylmethanediamine, 1,4-cyclohexane bis(methylamine), 1,3-cyclohexane bis(methylamine), diethylene glycol di(aminopropyl)ether, 2-methylpentamethylenediamine, diaminocyclohexane, diethylenetriamine, triethylenetetramine, tetraethylenepentamine, propylenediamine, 1,3-diaminopropane, dimethylaminopropylamine, diethylaminopropylamine, dipropylenetriamine, imidobis(propylamine), monoethanolamine, diethanolamine, triethanolamine, monoisopropanolamine, diisopropanolamine, isophoronediamine, 4,4'-methylenebis(2-chloroaniline), is 3,5-dimethylthio-2,4-toluenediamine, 3,5-dimethylthio-2,6-toluenediamine, 3,5-diethylthio-2,4-toluenediamine, 3,5-diethylthio-2,6-toluenediamine, 4,4'-bis(sec-butylamino) diphenylmethane and derivatives thereof, 1,4-bis(sec-butylamino)benzene, 1,2-bis(sec-butylamino)benzene, N,N'-dialkylaminodiphenylmethane, N,N,N',N'-tetrakis(2-hydroxypropyl)ethylenediamine, trimethylene glycol di-p-aminobenzoate, polytetramethylene oxide di-p-aminobenzoate, 4,4'-methylenebis(3-chloro-2,6-diethyleneaniline), 4,4'-methylenebis(2,6-diethylaniline), m-phenylenediamine, p-phenylenediamine and mixtures thereof. These amine curing agents may be used singly or as combinations of two or more thereof.

(iii) Polyol

Although not an essential component, in addition to the above-described components (i) and (ii), a polyol may also be included in the polyurea. The polyol is not particularly limited, but is preferably one that has hitherto been used in the art relating to thermoplastic polyurethanes. Specific examples include the long-chain polyols and/or polyol curing agents described below.

The long-chain polyol may be any that has hitherto been used in the art relating to thermoplastic polyurethanes. Examples include, but are not limited to, polyester polyols, polyether polyols, polycarbonate polyols, polyester polycarbonate polyols, polyolefin-based polyols, conjugated diene polymer-based polyols, castor oil-based polyols, silicone-based polyols and vinyl polymer-based polyols. These long-chain polyols may be used singly or as combinations of two or more thereof.

The long-chain polyol has a number-average molecular weight of preferably from 500 to 5,000, and more preferably from 1,700 to 3,500. In this average molecular weight range, an even better resilience and productivity are obtained.

The polyol curing agent is preferably one that has hitherto been used in the art relating to thermoplastic polyurethanes, but is not subject to any particular limitation. In this invention, use may be made of a low-molecular-weight compound having on the molecule at least two active hydrogen atoms capable of reacting with isocyanate groups, and having a molecular weight of less than 1,000. Of these, the use of aliphatic diols having from 2 to 12 carbons is preferred. Specific examples include 1,4-butylene glycol, 1,2-ethylene glycol, 1,3-butanediol, 1,6-hexanediol and 2,2-dimethyl-1, 3-propanediol. The use of 1,4-butylene glycol is especially preferred. The polyol curing agent has a number-average molecular weight of preferably less than 800, and more preferably less than 600.

Where necessary, various additives may also be included in the polyurethane and polyurea. For example, pigments, inorganic fillers, dispersants, antioxidants, light stabilizers, ultraviolet absorbers and mold release agents may be suitably included.

A known method may be used to produce the polyurea. A prepolymer process, a one-shot process or some other known method may be suitably selected for this purpose.

The method of molding the cover using the polyurethane and the polyurea may involve, for example, feeding these materials to an injection-molding machine and injecting them over the core. The molding temperature in such a case varies depending on the formulation and other factors, but is generally in the range of 150 to 270° C.

Treatment of Cover Surface

Next, the golf ball of the invention is characterized in that the surface of the outermost cover layer molded as described above is treated with an isocyanate compound that is free of organic solvent. The method of carrying out this surface treatment is described below.

This treatment method uses an isocyanate compound that is free of organic solvent. The isocyanate compound, although not particularly limited, is typically selected from the following group.

<Group of Isocyanate Compounds for Selection>

The group consisting of tolylene-2,6-diisocyanate, tolylene-2,4-diisocyanate, 4,4'-diphenylmethane diisocyanate, polymethylene polyphenyl polyisocyanate, 1,5-diisocyanatonaphthalene, isophorone diisocyanate (including isomer mixtures), dicyclohexylmethane-4,4'-diisocyanate, hexamethylene-1,6-diisocyanate, m-xylylene diisocyanate, hydrogenated xylylene diisocyanate, tolidine diisocyanate, norbornene diisocyanate, derivatives of these, and prepolymers formed of such isocyanate compounds.

An aromatic isocyanate compound is preferably used as the isocyanate compound, with the use of 4,4'-diphenylmethane diisocyanate (monomeric, or "pure," MDI) or polymethylene polyphenyl polyisocyanate (polymeric MDI) being especially preferred. When an aromatic isocyanate compound is used in the invention, because it has a high reactivity with the reactive groups on the thermoplastic resin, the intended effects of the invention can be successfully achieved. The use of polymeric MDI is preferred because it has a larger number of isocyanate groups than monomeric MDI and thus provides a large scuff resistance-improving effect due to crosslink formation, and moreover because it is in a liquid state at normal temperatures and thus has an excellent handleability. However, polymeric MDI generally has a dark brown appearance, which may discolor and contaminate the cover material to be treated. Because such discoloration is pronounced when treatment is carried out with polymeric MDI in the form of a solution obtained by dissolution in an organic solvent, in the practice of the invention, owing to concern over such discoloration, the polymeric MDI is used in a state that is free of organic solvents. Alternatively, commercial products may be suitably used as the polymeric MDI. Illustrative examples include Sumidur p-MDI 44V20L, 44V10, 44V40 and SBU Isocyanate J243 from Sumika Bayer Urethane Co., Ltd.; MONDUR MR Light from Bayer Material Science; PAPI 27 Polymeric MDI from Dow Chemical Company; Millionate MR-100, MR-200 and MR-400 from Tosoh Corporation; and Lupranate M20S, M11S and M5S from BASF INOAC Polyurethane, Ltd.

The preliminary treatments described in, for example, JP 4114198 and JP 4247735 may be suitably used as methods for reducing discoloration by polymeric MDI. Although the techniques described in these patent publications may be adopted for use here, the possibilities are not limited to these techniques alone. When such preliminary treatment is carried out and the treatment is followed by suitable washing, substantially no discoloration or contamination arises.

A dipping method, coating method (spraying method), infiltration method under heat and pressure application, dropwise addition method or the like may be suitably used as the method of treatment with the isocyanate compound. From the standpoint of process control and productivity, the use of a dipping method or coating method is especially preferred. The length of treatment by the dipping method is preferably from 1 to 180 minutes, more preferably from 10 to 120 minutes, and even more preferably from 20 to 90 minutes. When the treatment time is too short, a sufficient crosslinking effect is difficult to obtain. On the other hand, when the treatment time is too long, there is a possibility of substantial discoloration of the cover surface by excess isocyanate compound. Also, with a long treatment time, the production lead time becomes long, which is not very desirable from the standpoint of productivity. With regard to the temperature during such treatment, from the standpoint of productivity, it is preferable to control the temperature within a range that allows a stable molten liquid state to be maintained and also allows the reactivity to be stably maintained. The temperature is preferably from 10 to 80° C., more preferably from 15 to 70° C., and even more preferably from 20 to 60° C. If the treatment temperature is too low, infiltration and diffusion to the cover material or reactivity at the surface layer interface may be inadequate, as a result of which the desired properties may not be achieved. On the other hand, if the treatment temperature is too high, infiltration and diffusion to the outermost cover layer material or reactivity at the surface layer interface may increase and there is a possibility of greater discoloration of the outermost cover layer surface on account of excess isocyanate compound. Also, in cases where the ball appearance—including the shapes of the dimples—changes, or an ionomeric material is used in part of the golf ball, there is a possibility that this will give rise to changes in the physical properties of the ball. By carrying out treatment for a length of time and at a temperature in these preferred ranges, it is possible to obtain a sufficient crosslinking effect and, in turn, to achieve the desired ball properties without a loss of productivity.

To control the reactivity and obtain a golf ball having an even better scuff resistance and spin performance, a catalyst or a compound having two, three or more functional groups that react with isocyanate groups can be incorporated beforehand in the isocyanate compound treatment agent or in the outermost cover layer material to be treated. The method of incorporating such a compound may involve mixing the compound, in a dispersed state, with a liquid melt of the isocyanate compound treatment agent; using a mixer such as a single-screw or twin-screw extruder to mix the compound into the thermoplastic resin that is the material to be treated (cover material); or charging the respective ingredients in a dry blended state into an injection molding machine. When the last of these methods is used, during charging, the compound may be charged alone, or may be rendered beforehand into a masterbatch state using a suitable base material.

Following treatment with the above isocyanate compound, when excess isocyanate compound remains on the ball surface, this tends to cause adverse effects such as logo mark transfer defects and the peeling of paint, and moreover may lead to appearance defects such as discoloration over time. Hence, it is preferable to wash the ball surface with a suitable organic solvent, water or the like. Particularly in cases where polymeric MDI is used, because this compound is a dark brown-colored liquid, unless the ball surface is thoroughly washed, appearance defects may end up arising. The organic solvent used at this time should be suitably selected from among organic solvents that dissolve the isocyanate compound and do not dissolve the polyurethane, polyurea or a mixture thereof serving as a component of the outermost cover layer material. Preferred use can be made of esters, ketones as well other suitable organic solvents such as benzene, dioxane or carbon tetrachloride which dissolve the isocyanate compound. In particular, acetone, ethyl acetate, methyl ethyl ketone, methyl isobutyl ketone, toluene or xylene, either alone or in admixture, may be suitably used as the organic solvent, although the choices are not necessarily limited to these. Washing with the above organic solvent may be carried out by an ordinary method. For example, use may be made of dipping, shaking, ultrasound, microbubbles or nanobubbles, a submerged jet or a shower. It is desirable for the washing time to be set so as to complete washing in preferably not more than 120 seconds, more preferably not more than 60 seconds, and even more preferably not more than 30 seconds. If the washing time is long and excess washing occurs, although appearance defects due to the residual presence of isocyanate compound are suppressed, the isocyanate compound with which the surface of the golf ball cover has been treated may end up being removed, as a result of which crosslinking may not proceed to a sufficient degree. There is also a possibility of undesirable effects owing to penetration of the organic solvent into the outermost cover layer material and consequent swelling of the material, such as changes in shape due to the relaxation of residual stresses that have arisen in the outermost cover layer during molding, damage to the resin interface that has formed during molding, and dissolution of low-molecular-weight ingredients. Hence, it is preferable to carry out washing for a suitable treatment time. In addition, there is a possibility that an optimal flight performance may not be achieved or that the distance traveled by the ball may be adversely affected by solvent-induced changes in the dimple shapes or swelling of the support pin marks that form during injection molding.

Drying treatment may be carried out preliminary to surface treatment with the above isocyanate compound. That is, when treating an outermost cover layer molded from a thermoplastic material that includes a polyurethane, a polyurea or a mixture thereof, to remove moisture contained in the outermost cover layer material and thereby stabilize the physical properties following treatment and increase the life of the treatment solution, it may be desirable to carry out, as needed, drying treatment or the like beforehand, although this is not always the case. A common method such as warm-air drying or vacuum drying may be used as the drying treatment. Such treatment preliminary to surface treatment, particularly in the case of golf balls containing an ionomeric material in a portion thereof, is preferably carried out under conditions that do not cause deformation or changes in the physical properties. When warm air drying is carried in such preliminary treatment, although not particularly limited, it is desirable to set the temperature to from 15 to 60° C., and preferably from 20 to 55° C., and to set the time to preferably from 10 to 180 minutes, more preferably from 15 to 120 minutes, and even more preferably from 30 to 60 minutes. The drying conditions may be suitably selected according to the moisture content within the outermost cover layer material and are typically adjusted so that the moisture content in the outermost cover layer material becomes preferably 5,000 ppm or less, more preferably 3,500 ppm or less, even more preferably 2,500 ppm or less, and most preferably 1,000 ppm or less.

Following surface treatment with the isocyanate compound, it is preferable to provide a suitable curing step in order to have the crosslinking reactions between the polyurethane or polyurea thermoplastic material and the isocyanate compound effectively proceed, thereby enhancing and stabilizing the physical properties and quality, and also to control and shorten the production takt time. However, because reaction of the isocyanate proceeds even at room temperature, it is not always necessary to provide a curing step. In cases where a curing step is provided, a method that causes the crosslinking reactions to proceed under the effect of heat or pressure and in the presence of a catalyst may be suitably selected. Specifically, it is preferable to carry out heating treatment under suitable temperature and time conditions that are typically from 15 to 150° C. for up to 24 hours, preferably from 20 to 100° C. for up to 12 hours, and more preferably from 30 to 70° C. for up to 6 hours.

Following surface treatment with the isocyanate compound, the degree to which crosslinking reactions between the polyurethane or polyurea thermoplastic material and the isocyanate compound have proceeded can be determined by a suitable technique. For example, the degree to which crosslinking has proceeded can be determined by immersing the outermost cover layer material in a solvent such as tetrahydrofuran, chloroform or dimethylformamide, and measuring the weight of the dissolved matter. Another effective method is to measure the microhardness in the cross-sectional direction of the cover. By checking the hardness variations in the cover cross-sectional direction in terms of microhardness, qualitative and quantitative characterization of the treated region is possible.

The pickup of isocyanate compound following the above surface treatment can be suitably adjusted according to the weight and desired properties of the golf ball as a whole. This pickup, expressed in terms of weight change, is preferably in the range of 0.01 to 1.0 g, more preferably in the range of 0.03 to 0.8 g, and even more preferably in the range of 0.05 to 0.75 g. When the weight change is too small, impregnation by the isocyanate compound may be inadequate and suitable property enhancing effects may not be obtained. When the weight change is too large, control of the ball weight within a range that conforms to the rules for golf balls and various types of control, including of dimple changes, may be difficult. With regard to the depth of impregnation by the isocyanate compound, the process conditions may be suitably selected so as to obtain the desired physical properties. Modification by this method has the effect of, given that the isocyanate compound penetrates and disperses from the surface, making it easy to confer variations in the physical properties. Conferring physical property variations within an outermost cover layer of a given thickness simulates, and indeed serves the same purpose as, providing a cover layer that is itself composed of multiple layers, thus making it possible to achieve cover characteristics that never before existed. Moreover, the state of impregnation by the isocyanate compound may vary depending on whether an organic solvent is present. When an organic solvent is used, changes in the physical properties can be achieved to a greater depth; when an organic solvent is not used, changes in the physical properties are easily imparted at positions closer to the interface. When treatment is carried out by a method that does not use an organic solvent, the physical properties near the surface of the outermost cover layer and the physical properties at the cover interior are easily differentiated, which has the advantage of enabling a greater degree of freedom in golf ball design to be achieved.

The materials making up the covers layers other than the outermost layer are not particularly limited. These may be formed of, for example, ionomer resins, polyester resins, polyamide resins, and also polyurethane resins. For example, an ionomer resin or a highly neutralized ionomer resin may be used in the envelope layer and the intermediate layer, and the outermost layer may be formed of the above-described polyurethane resin.

The core may be formed using a known rubber material as the base material. A known base rubber such as natural rubber or a synthetic rubber may be used as the base rubber. More specifically, the use of primarily polybutadiene, especially cis-1,4-polybutadiene having a cis structure content of at least 40%, is recommended. Where desired, a natural rubber, polyisoprene rubber, styrene-butadiene rubber or the like may be used in the base rubber together with the above polybutadiene. The polybutadiene may be synthesized with a titanium-based, cobalt-based, nickel-based or neodymium-based Ziegler catalyst or with a metal catalyst such as cobalt or nickel.

Co-crosslinking agents such as unsaturated carboxylic acids and metal salts thereof, inorganic fillers such as zinc oxide, barium sulfate and calcium carbonate, and organic peroxides such as dicumyl peroxide and 1,1-bis(t-butylperoxy)cyclohexane may be blended with the base rubber. In addition, where necessary, other ingredients such as commercial antioxidants may suitably added.

As explained above, the golf ball of the invention, by imparting variations in the degree to which internal cross-linking within urethane resin proceeds at an inside portion and an outside portion of an outermost layer having a specific thickness, simulates and thus serves the same purpose as providing a cover layer that is itself composed of multiple layers. This makes it possible to obtain an excellent scuff resistance and spin performance not previously achieved, and also a good feel on approach shots, good discoloration resistance and good productivity.

EXAMPLES

Working Examples of the invention and Comparative Examples are given below by way of illustration, although the invention is not limited by the following Examples.

Examples 1 to 20, Comparative Examples 1 to 3

Cores having a diameter of 36.3 mm were produced by using the formulation shown in Table 1 to prepare a core-forming rubber composition common to all the Examples, then curing and molding at 155° C. for 15 minutes. Next, cover layers (these being, in order from the inside: an envelope layer and an intermediate layer) formulated of the resin materials shown in the same table and common to all the Examples were successively injection-molded over the core, thereby giving an intermediate sphere. The envelope layer had a thickness of 1.3 mm and a material hardness, expressed in terms of Shore D hardness, of 51. The intermediate layer had a thickness of 1.1 mm and a material hardness, expressed in terms of Shore D hardness, of 62.

The outermost cover layer, which differs in each Example, was injection-molded over the intermediate sphere. The resin materials used to form the outermost layer are is shown in Table 2. The outermost layer had a thickness of 0.8 mm. Although not shown in the accompanying diagrams, numerous dimples were formed on the outside surface of the outermost layer at the same time as injection molding.

TABLE 1

| Ball component | | Formulated ingredients | Amounts |
|---|---|---|---|
| Cover | Intermediate layer | Himilan 1605 | 50 |
| | | Himilan 1557 | 15 |
| | | Himilan 1706 | 35 |
| | | Trimethylolpropane | 1.1 |
| | Envelope layer | HPF1000 | 100 |
| | Core | Polybutadiene A | 80 |
| | | Polybutadiene B | 20 |
| | | Organic peroxide | 1 |
| | | Barium sulfate | 21.5 |
| | | Zinc oxide | 4 |
| | | Zinc acrylate | 29.5 |
| | | Antioxidant | 0.1 |
| | | Zinc salt of pentachlorothiophenol | 0.3 |

Details on these core materials are given below. Numbers in the table indicate parts by weight.

Polybutadiene A: Available from JSR Corporation under the trade name "BR 01"

Polybutadiene B: Available from JSR Corporation under the trade name "BR 51"

Organic Peroxide: Dicumyl peroxide, available under the trade name "Percumyl D" (NOF Corporation)

Barium sulfate: Available from Sakai Chemical Co., Ltd. as "Precipitated Barium Sulfate 100"

Zinc oxide: Available from Sakai Chemical Co., Ltd.

Zinc acrylate: Available from Nihon Joryu Kogyo Co., Ltd.

Antioxidant: 2,2'-Methylenebis(4-methyl-6-t-butylphenol), available under the trade name "Nocrac NS-6" (Ouchi Shinko Chemical Industry Co., Ltd.)

Details on the cover (envelope layer, intermediate layer) materials are given below. Numbers in the table indicate parts by weight.

HPF 1000: An ionomer from E.I. DuPont de Nemours & Co.

Himilan 1605: A sodium ionomer from DuPont-Mitsui Polychemicals Co., Ltd.

Himilan 1557: A zinc ionomer from DuPont-Mitsui Polychemicals Co., Ltd.

Himilan 1706: A zinc ionomer from DuPont-Mitsui Polychemicals Co., Ltd.

The hardnesses of these resin materials are values obtained by molding each resin material into 2 mm-thick sheets which were stored at 23° C. for 2 weeks, then stacked to a thickness of at least 6 mm and measured using a type D durometer in accordance with ASTM D2240-95.

TABLE 2

| Resin formulation (pbw) | I | II | III | IV | V | VI |
|---|---|---|---|---|---|---|
| Pandex T8283 | 25 | | | 60 | 25 | |
| Pandex T8290 | 75 | 50 | | 40 | 75 | |
| Pandex T8295 | | 50 | 75 | | | 100 |
| Pandex T8260 | | | 25 | | | |
| Hytrel 4001 | 12 | 12 | 12 | 12 | 12 | 12 |
| Titanium oxide | 3.5 | 3.5 | 3.5 | 3.5 | 3.5 | 3.5 |
| Ultramarine | 0.4 | 0.4 | 0.4 | 0.4 | 0.4 | 0.4 |
| Polyethylene wax | 1 | 1 | 1 | 1 | 1 | 1 |
| Montan wax | 0.4 | 0.4 | 0.4 | 0.4 | 0.4 | 0.4 |
| Isocyanate compound | | | | 7.5 | 7.5 | 7.5 |

Details on the cover (outermost layer) materials are given below. Numbers in the table indicate parts by weight.

T-8260, T-8283, T-8290, T-8295:
Ether-type thermoplastic polyurethanes available under the trademark Pandex from DIC Bayer Polymer Hytrel 4001: A polyester elastomer available from DuPont-Toray Co., Ltd.

Polyethylene wax: Available under the trade name "Sanwax 161P" from Sanyo Chemical Industries, Ltd.

Titanium oxide: Tipaque R680, available from Ishihara Sangyo Kaisha, Ltd.

Isocyanate compound: 4,4'-Diphenylmethane diisocyanate

Next, surface treatment was carried out at the surface of the outermost layer in each Example using polymeric MDI available under the trade name "Sumidur p-MDI 44V20L" from Sumika Bayer Urethane Co., Ltd. This surface treatment involved successively carrying out the following steps under the conditions shown in Table 3 and Tables 4 to 6: (1) preliminary warming, (2) dipping treatment in an isocyanate compound, (3) washing with acetone, and (4) curing. Dipping treatment in an isocyanate compound involved carrying out dipping treatment such that the entire ball is thoroughly immersed in isocyanate compound alone without using solvent.

TABLE 3

| Surface treatment conditions | | |
|---|---|---|
| Preliminary warming | Temperature | 48° C. |
| | Time | 60 minutes |

TABLE 3-continued

| Surface treatment conditions | | |
|---|---|---|
| Washing | Solution type | acetone |
| | Time | 30 seconds |
| Curing | Temperature | 55° C. |
| | Time | 60 minutes |

Golf balls on which the above surface treatment had been carried out were tested and evaluated by the methods described below. The results are shown in Tables 4 to 6.

FT-IR Absorbance

The infrared absorption spectrum was measured by the ATR method and plotted as absorbance versus wave number. To increase the accuracy of the measurement data, each absorbance peak height was determined by carrying out measurement N times so that the relative standard deviation (%) (referred to below as "RSD %") becomes 3.0% or less. Measurement was carried out seven days after surface treating the outermost layer. The instrument used was the "Spectrum 100, System B" Fourier transform infrared spectrophotometer (from Perkin Elmer). Samples were measured under the following conditions.

Measurement method: Attenuated total reflection (ATR)

Detector: FR-DTGS

Resolution: 4 $cm^{-1}$

Cumulative number: 16 times

Measurement wave number range: 4000 $cm^{-1}$ to 650 $cm^{-1}$

Place of measurement:
[Outside portion] Surface portion of outermost layer (0 μm)
[Inside portion] Portion 50 μm from back face of outermost layer toward surface Scuff Resistance The balls were held isothermally at 0° C. or 23° C. and five balls of each type were hit at a head speed of 33 m/s using as the club a pitching wedge mounted on a swing robot machine. The damage to the ball from the impact was visually evaluated based on the following 5-point scale, and the average score for each type of ball was calculated.

5: No damage or substantially no damage.
4: Damage is apparent but so slight as to be of substantially no concern.
3: Surface is slightly frayed.
2: Some fraying of surface or loss of dimples.
1: Dimples completely obliterated in places.

Discoloration Resistance

Instrument name: Super Xenon Weather Meter
Manufacturer: Suga Test Instruments Co., Ltd.
Measurement conditions:
Measurement was carried out under the following conditions based on JIS K 7350-2.
Irradiance (300 to 400 nm): 180 $W/m^2$
Black panel temperature: 63±3° C.
Temperature within test chamber: 38±3° C.
Humidity within test chamber: 50±10%
Test time: 6 hours The change in color at the ball surface before and after irradiation was measured using a color difference meter (model SC-P, from Suga Test Instruments Co., Ltd.), and the susceptibility to yellowing (ΔYI) of the ball before irradiation and after irradiation was determined based on Lab color measurement. A larger value indicates greater yellowing.

The evaluation criteria were as follows.
Good: less than 6
Fair: 6 or more and less than 10
NG: 10 or more Spin Performance A driver (W#1) was mounted on a golf swing robot, and the spin rate when the ball was struck at a head speed of 45 m/s was measured. The club used was a TourStage X-Drive 707 (2012 model; loft angle,)9.5° manufactured by Bridgestone Sports Co., Ltd.

Feel on Approach Shots

Eight golfers scored the feel of the ball on approach shots based on the following three-point scale.

3: Good feel
2: Cannot say either way
1: Poor feel
(When contact with the ball on approach shots is too crisp, the feel is often poor and there is a sense of poor controllability, which is not very desirable.)

Productivity

The percentage of balls with defects such as burn contaminants was determined for 1,000 molded golf balls. Balls having a percent defective lower than 2.5% were rated as "Good"; balls having a percent defective of 2.5% or more were rated as "NG."

TABLE 4

| | | | Example | | | | | | Comp. Ex. |
|---|---|---|---|---|---|---|---|---|---|
| | | | 1 | 2 | 3 | 4 | 5 | 6 | 1 |
| Outermost layer | Type | | I | | | | | | IV |
| Dipping treatment | Treatment temperature (° C.) | | 48 | 48 | 48 | 53 | 53 | 53 | no treatment |
| | Treatment time (minutes) | | 30 | 40 | 50 | 30 | 40 | 50 | |
| Absorbance | 1512 cm$^{-1}$ | Outside peak height P1 | 0.173 | 0.180 | 0.187 | 0.184 | 0.191 | 0.194 | 0.172 |
| | 1512 cm$^{-1}$ | Inside peak height P2 | 0.005 | 0.005 | 0.005 | 0.005 | 0.005 | 0.005 | 0.170 |
| | | P1 − P2 | 0.169 | 0.175 | 0.183 | 0.179 | 0.186 | 0.189 | 0.002 |
| | 2280 cm$^{-1}$ | Peak height Q1 | 0.007 | 0.009 | 0.010 | 0.008 | 0.011 | 0.010 | 0.039 |
| | 2840 cm$^{-1}$ | Peak height R1 | 0.170 | 0.169 | 0.168 | 0.169 | 0.168 | 0.166 | 0.160 |
| | | Q1/R1 | 0.042 | 0.051 | 0.060 | 0.050 | 0.063 | 0.059 | 0.245 |
| Ball performance | Scuff resistance | 23° C. average | 4.6 | 4.4 | 4.4 | 4.5 | 4.5 | 4.4 | 4.1 |
| | | 0° C. average | 3.3 | 3.3 | 3.3 | 3.1 | 3.3 | 2.9 | 2.8 |
| | | Overall average | 4.0 | 3.9 | 3.9 | 3.8 | 3.9 | 3.7 | 3.5 |
| | Discoloration | ΔYI | 3.6 | 4.0 | 5.3 | 4.2 | 5.9 | 9.8 | 17.7 |
| | | Rating | good | good | good | good | good | fair | NG |
| | Spin performance | W#1 (rpm) | 2,824 | 2,899 | 2,922 | 2,864 | 2,869 | 2,935 | 2,961 |
| | Feel on approach shots | Score | 3.0 | 3.0 | 3.0 | 3.0 | 3.0 | 3.0 | 2.3 |
| | Productivity | Rating | good | good | good | good | good | good | NG |

TABLE 5

| | | | Example | | | | | | Comp. Ex. |
|---|---|---|---|---|---|---|---|---|---|
| | | | 7 | 8 | 9 | 10 | 11 | 12 | 2 |
| Outermost layer | Type | | II | | | | | | V |
| Dipping treatment | Treatment temperature (° C.) | | 48 | 48 | 48 | 53 | 53 | 53 | no treatment |
| | Treatment time (minutes) | | 30 | 40 | 50 | 30 | 40 | 50 | |
| Absorbance | 1512 cm$^{-1}$ | Outside peak height P1 | 0.198 | 0.200 | 0.213 | 0.207 | 0.211 | 0.214 | 0.197 |
| | 1512 cm$^{-1}$ | Inside peak height P2 | 0.007 | 0.007 | 0.008 | 0.008 | 0.009 | 0.009 | 0.191 |
| | | P1 − P2 | 0.190 | 0.192 | 0.205 | 0.200 | 0.202 | 0.205 | 0.006 |
| | 2280 cm$^{-1}$ | Peak height Q1 | 0.008 | 0.009 | 0.010 | 0.010 | 0.012 | 0.011 | 0.044 |
| | 2840 cm$^{-1}$ | Peak height R1 | 0.163 | 0.162 | 0.161 | 0.160 | 0.159 | 0.159 | 0.154 |
| | | Q1/R1 | 0.049 | 0.057 | 0.063 | 0.060 | 0.075 | 0.071 | 0.284 |
| Ball performance | Scuff resistance | 23° C. average | 3.9 | 3.9 | 4.1 | 4.1 | 4.2 | 3.9 | 3.8 |
| | | 0° C. average | 2.3 | 2.4 | 2.5 | 2.6 | 2.7 | 2.7 | 2.4 |
| | | Overall average | 3.1 | 3.2 | 3.3 | 3.3 | 3.4 | 3.5 | 3.1 |
| | Discoloration | ΔYI | 3.5 | 3.3 | 4.1 | 4.1 | 4.1 | 4.9 | 20.2 |
| | | Rating | good | good | good | good | good | good | NG |
| | Spin performance | W#1 (rpm) | 2,802 | 2,823 | 2,842 | 2,811 | 2,817 | 2,844 | 2,888 |
| | Feel on approach shots | Score | 3.0 | 3.0 | 3.0 | 3.0 | 3.0 | 3.0 | 2.1 |
| | Productivity | Rating | good | good | good | good | good | good | NG |

TABLE 6

|  |  |  |  | Example | | | | |
|---|---|---|---|---|---|---|---|---|
|  |  |  |  | 13 | 14 | 15 | 16 | 17 |
| Outermost layer | Type |  |  | III | | | | |
| Dipping treatment | Treatment temperature (° C.) |  |  | 48 | 48 | 48 | 53 | 53 |
|  | Treatment time (minutes) |  |  | 40 | 50 | 60 | 40 | 50 |
| Absorbance | 1512 cm$^{-1}$ | Outside peak height | P1 | 0.214 | 0.221 | 0.225 | 0.226 | 0.234 |
|  | 1512 cm$^{-1}$ | Inside peak height | P2 | 0.010 | 0.010 | 0.011 | 0.010 | 0.011 |
|  |  |  | P1 − P2 | 0.204 | 0.211 | 0.214 | 0.216 | 0.224 |
|  | 2280 cm$^{-1}$ | Peak height | Q1 | 0.007 | 0.008 | 0.009 | 0.009 | 0.011 |
|  | 2840 cm$^{-1}$ | Peak height | R1 | 0.152 | 0.151 | 0.152 | 0.150 | 0.150 |
|  |  |  | Q1/R1 | 0.048 | 0.051 | 0.058 | 0.062 | 0.074 |
| Ball performance | Scuff resistance | 23° C. average |  | 3.8 | 3.9 | 3.7 | 4.0 | 4.1 |
|  |  | 0° C. average |  | 2.1 | 2.4 | 2.4 | 2.4 | 2.3 |
|  |  | Overall average |  | 3.0 | 3.1 | 3.0 | 3.2 | 3.2 |
|  | Discolorstion | ΔYI |  | 3.3 | 3.1 | 3.8 | 3.2 | 5.8 |
|  |  | Rating |  | good | good | good | good | good |
|  | Spin performance | W#1 (rpm) |  | 2,626 | 2,617 | 2,631 | 2,588 | 2,640 |
|  | Feel on approach shots | Score |  | 3.0 | 3.0 | 3.0 | 3.0 | 3.0 |
|  | Productivity | Rating |  | good | good | good | good | good |

|  |  |  |  | Example | | | Comp. Ex. |
|---|---|---|---|---|---|---|---|
|  |  |  |  | 18 | 19 | 20 | 3 |
| Outermost layer | Type |  |  | III | | | VI |
| Dipping treatment | Treatment temperature (° C.) |  |  | 53 | 58 | 58 | no treatment |
|  | Treatment time (minutes) |  |  | 60 | 40 | 50 |  |
| Absorbance | 1512 cm$^{-1}$ | Outside peak height | P1 | 0.238 | 0.229 | 0.232 | 0.218 |
|  | 1512 cm$^{-1}$ | Inside peak height | P2 | 0.011 | 0.010 | 0.011 | 0.207 |
|  |  |  | P1 − P2 | 0.227 | 0.219 | 0.220 | 0.011 |
|  | 2280 cm$^{-1}$ | Peak height | Q1 | 0.016 | 0.009 | 0.009 | 0.052 |
|  | 2840 cm$^{-1}$ | Peak height | R1 | 0.149 | 0.150 | 0.149 | 0.146 |
|  |  |  | Q1/R1 | 0.106 | 0.063 | 0.061 | 0.356 |
| Ball performance | Scuff resistance | 23° C. average |  | 3.8 | 3.8 | 4.0 | 3.8 |
|  |  | 0° C. average |  | 2.4 | 2.4 | 2.4 | 2.2 |
|  |  | Overall average |  | 3.1 | 3.1 | 3.2 | 3.0 |
|  | Discolorstion | ΔYI |  | 5.9 | 5.4 | 6.6 | 18.3 |
|  |  | Rating |  | good | good | fair | NG |
|  | Spin performance | W#1 (rpm) |  | 2,620 | 2,662 | 2,677 | 2,697 |
|  | Feel on approach shots | Score |  | 3.0 | 3.0 | 3.0 | 1.9 |
|  | Productivity | Rating |  | good | good | good | NG |

As is apparent from the results in Tables 4 to 6, because the $P_1-P_2$ value representing the difference between the absorbance peak heights near the wave number 1512 cm$^{-1}$ at the outside portion and the inside portion of the outermost cover layer was smaller in the balls obtained in Comparative Examples 1 to 3 than in the balls obtained in the Working Examples of the invention, in terms of ball performance, the balls obtained in the Comparative Examples had a large discoloration, lacked a good feel on approach shots, and had a poor productivity.

The invention claimed is:

1. A golf ball comprising a core and a cover of one or more layer encasing the core, wherein the cover has an outermost layer molded of an ether type thermoplastic polyurethane material and the surface of the cover is treated with an isocyanate compound comprising polymethylene polyphenyl polyisocyanate that is free of organic solvent, and the pickup of the isocyanate compound is in the range of 0.01 to 1.0 g, and wherein, letting the absorbance peak heights near a wave number of 1512 cm$^{-1}$ measured by the attenuated total reflectance method in Fourier transform infrared absorption spectroscopy (FT-IR/ATR spectroscopy) at an outside portion and an inside portion of the outermost cover layer be respectively $P_1$ and $P_2$, the value $P_1-P_2$ is at least 0.02.

2. The golf ball of claim 1, wherein the value $P_1-P_2$ obtained from the absorbance peak heights $P_1$ and $P_2$ at the outside portion and inside portion of the outermost cover layer is from 0.05 to 0.35.

3. The golf ball of claim 1, wherein the absorbance peak height $P_1$ at the outside portion of the outermost cover layer is from 0.15 to 0.40.

4. The golf ball of claim 1, wherein the absorbance peak height $P_2$ at the inside portion of the outermost cover layer is from 0 to 0.10.

5. The golf ball of claim 1 wherein, letting the absorbance peak height near the wave number 2280 cm$^{-1}$ and the absorbance peak height near the wave number 2840 cm$^{-1}$ measured by FT-IR/ATR spectroscopy at the outside portion of the outermost cover layer be respectively $Q_1$ and $R_1$, the value $Q_1/R_1$ is 0.20 or less.

6. The golf ball of claim 1, wherein the isocyanate compound is a mixture of 4,4'-diphenylmethanediisocyanate and polymethylene polyphenyl polyisocyanate.

7. The golf ball of claim 1, wherein the value $P_1$-$P_2$ is from 0.169 to 0.227.

8. The golf ball of claim 1, wherein, letting the absorbance peak height near the wave number 2280 cm$^{-1}$ and the absorbance peak height near the wave number 2840 cm$^{-1}$ measured by FT-IR/ATR spectroscopy at the outside portion of the outermost cover layer be respectively $Q_1$ and $R_1$, the value $Q_1/R_1$ is from 0.042 to 0.106.

* * * * *